US011496691B2

(12) United States Patent
Chapman et al.

(10) Patent No.: US 11,496,691 B2
(45) Date of Patent: Nov. 8, 2022

(54) REALISTIC ILLUMINATION OF A CHARACTER FOR A SCENE (71) Applicant: Disney Enterprises, Inc., Burbank, CA (US)

(72) Inventors: Steven M. Chapman, Newbury Park, CA (US); Alice Taylor, Burbank, CA (US); Joseph Popp, Cerritos, CA (US)

(73) Assignee: Disney Enterprises, Inc., Burbank, CA (US)

( * ) Notice: Subject to any disclaimer, the term of this patent is extended or adjusted under 35 U.S.C. 154(b) by 377 days.

(21) Appl. No.: 16/716,238

(22) Filed: Dec. 16, 2019

(65) Prior Publication Data
US 2021/0185213 A1 Jun. 17, 2021

(51) Int. Cl.
H04N 5/235 (2006.01)
H04N 5/247 (2006.01)
G06T 7/80 (2017.01)
A63J 5/02 (2006.01)

(52) U.S. Cl.
CPC ............. H04N 5/2354 (2013.01); G06T 7/80 (2017.01); H04N 5/247 (2013.01); A63J 5/021 (2013.01)

(58) Field of Classification Search
None
See application file for complete search history.

(56) References Cited

U.S. PATENT DOCUMENTS

| 1,819,883 | A | 8/1931 | Fleischer |
| 9,621,869 | B2 | 4/2017 | Davidson et al. |
| 9,710,972 | B2 | 7/2017 | Rasmussen |
| 9,779,538 | B2 | 10/2017 | Rasmussen |
| 10,122,992 | B2 | 11/2018 | Siegel et al. |
| 10,313,607 | B2 | 6/2019 | Vonolfen et al. |
| 10,349,029 | B2 | 7/2019 | Benson |
| 10,885,701 | B1 * | 1/2021 | Patel ........................ A63F 13/57 |

(Continued)

FOREIGN PATENT DOCUMENTS

| FR | 2873456 | 1/2006 |
| WO | 2018/128741 A1 | 7/2018 |

OTHER PUBLICATIONS

New Zealand Patent Examination Report dated Oct. 6, 2021.
(Continued)

Primary Examiner — Michelle M Iacoletti
Assistant Examiner — Danell L Owens
(74) Attorney, Agent, or Firm — Farjami & Farjami LLP (57) ABSTRACT A system for illuminating a character for a scene includes a computing platform communicatively coupled to a lighting source and a camera, the computing platform including a hardware processor and a system memory storing a software code. The hardware processor executes the software code to identify a background for the scene, generate, using the lighting source, a simulation of the background on a surface illuminated by the lighting source, and utilize the simulation of the background generated on the surface illuminated by the lighting source to illuminate the character for the scene. The hardware processor also executes the software code to track, using the camera, a plurality of parameters of the camera during recording of an image of the illuminated character and the simulation of the background, and to remove the simulation of the background from the image based on the plurality of parameters of the camera.

20 Claims, 5 Drawing Sheets (56) References Cited

U.S. PATENT DOCUMENTS

| | | |
|---|---|---|
| 11,107,195 B1 | 8/2021 | Cordes |
| 11,132,837 B2 | 9/2021 | Cordes |
| 11,132,838 B2 | 9/2021 | Cordes |
| 11,200,752 B1 | 12/2021 | Cordes |
| 2005/0099603 A1 | 5/2005 | Thomas et al. |
| 2013/0182225 A1 | 7/2013 | Stout |
| 2015/0070467 A1 | 3/2015 | Crowder et al. |
| 2015/0103090 A1 | 4/2015 | Pettigrew et al. |
| 2015/0279113 A1* | 10/2015 | Knorr .................. G06T 19/006 345/633 |
| 2015/0289338 A1 | 10/2015 | Hochman |
| 2015/0347845 A1 | 12/2015 | Benson |
| 2016/0156893 A1 | 6/2016 | Bogusz et al. |
| 2021/0342971 A1 | 11/2021 | Watkins |
| 2021/0407174 A1 | 12/2021 | Walker |
| 2022/0005279 A1 | 1/2022 | Cordes |

OTHER PUBLICATIONS

"Introducing Smart IBL: Image based lighting has never been this clever!" Smart HDR Labs, IBL Overview http://www.hdrlabs.com/sibl/index.html pp. 1-3.

"MudGet: Reproduction of the Desired Lighting Environment using a Smart-LED" by Yong Hwi Kim, Yong Yi Lee, Bilal Ahmed, Moon Gu Son, Junho Choi, Jong Hun Lee, and Kwan H. Lee (Journal of Computational Design and Engineering 2017).

"Behind the Scenes with UE4's Next-Gen Virtual Production Tools" Project Spotlight, Unreal Engine Nov. 12, 12019 <https://www.youtube.com/watch?v=Hjb-AqMD-a4>.

First Examination Report dated Nov. 25, 2021 for Australian Patent Application 2020277170.

\* cited by examiner

REALISTIC ILLUMINATION OF A CHARACTER FOR A SCENE

BACKGROUND

Video content, such as movies and television programming, for example, is widely used to distribute entertainment to consumers. Due to its popularity with those consumers, ever more video is being produced and made available for distribution via traditional broadcast models, as well as streaming services. Consequently, efficient and cost-effective techniques for producing high quality video imagery are increasingly important to the creators and owners of that content.

In order to produce realistic scene-based lighting of a performer being filmed, it is important that the performer be illuminated by a close approximation of the lighting that does or will exist in a virtual environment or background in which the performer will be viewed. Because real physical lights are typically needed to illuminate the performer, conventional production techniques may include the inefficient process of manually rotoscoping the stage lighting from the image. An alternative conventional technique is to film the actor on a green matte screen. However, that green screen technique typically offers a poor representation of the environmental lighting effects being reflected from the performer. Although techniques for simulating an entire scene digitally are known, they often produce an "uncanny valley" effect or may simply be too expensive to be a practical alternative.

SUMMARY

There are provided systems and methods for realistically illuminating a character for a scene, substantially as shown in and/or described in connection with at least one of the figures, and as set forth more completely in the claims.

DETAILED DESCRIPTION

Figure 1A:
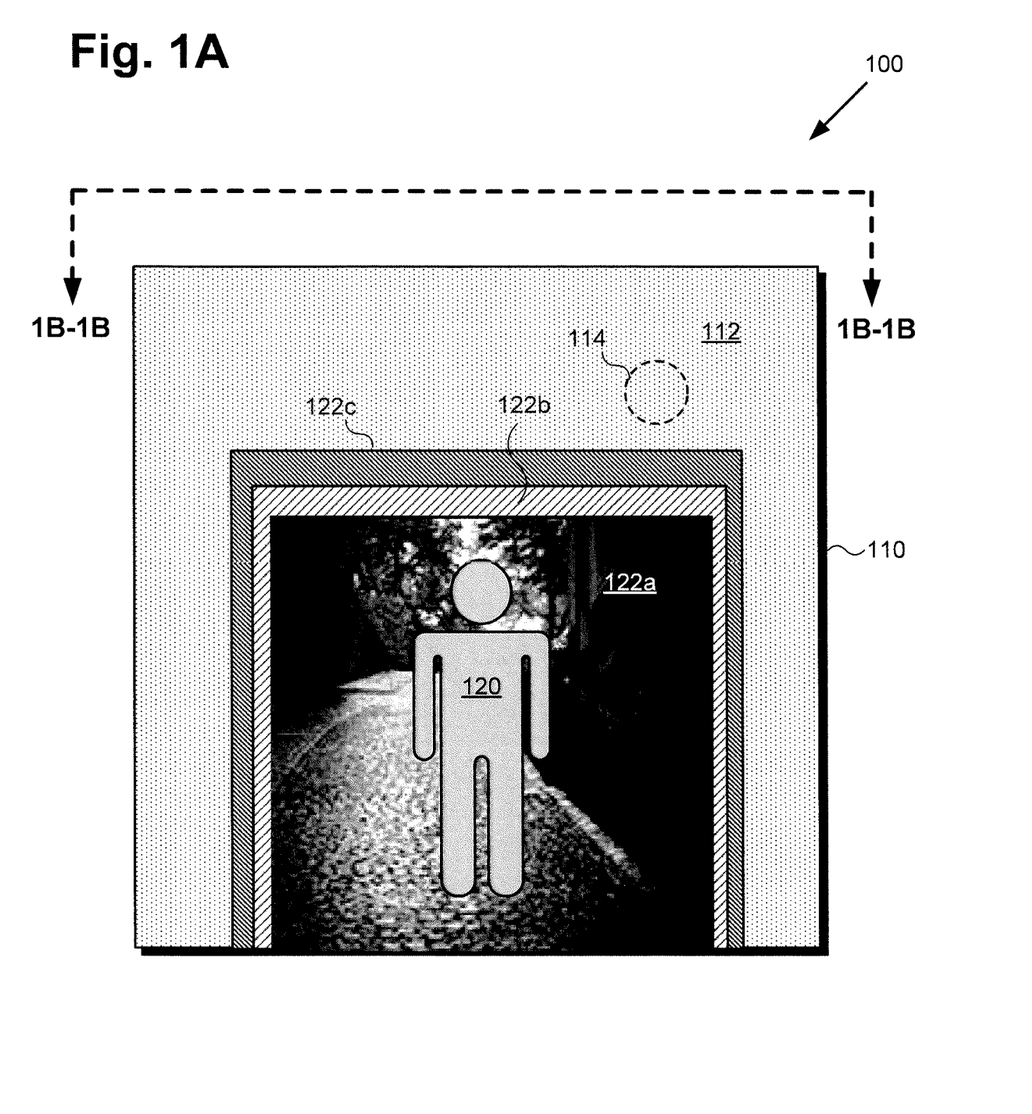
FIG. 1A shows a diagram of a portion of a system for illuminating a character for a scene, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions. The present application discloses systems and methods for illuminating a character for a scene that overcome the drawbacks and deficiencies in the conventional art. FIG. 1A shows a diagram of a portion of such a system, according to one implementation. As shown by FIG. 1A, system 100 includes lighting source 110 for generating simulations of one or more backgrounds 122a, 122b, and 122c for a scene including character 120 through illumination of surface 112 by lighting source 110. As further shown by FIG. 1A, surface 112 illuminated by lighting source 110 includes multiple individual lighting elements 114, which may be implemented as light-emitting diodes (LEDs), for example. Also shown in FIG. 1A are perspective lines 1B-1B.

Character 120 may be a virtual character, a machine such as a robot or animatronic character, a human actor, an animal, or other type of performer, for example. System 100 provides realistic lighting of character 120 relative to a scene in which character 120 is to be rendered. That is to say, system 100 identifies at least one background (e.g., background 122a) for the scene to include character 120, generates a simulation of background 122a on surface 112 illuminated by lighting source 110 using lighting elements 114 of lighting source 110, and utilizes the simulation of background 122a to illuminate character 120 for the scene.

Figure 1B:
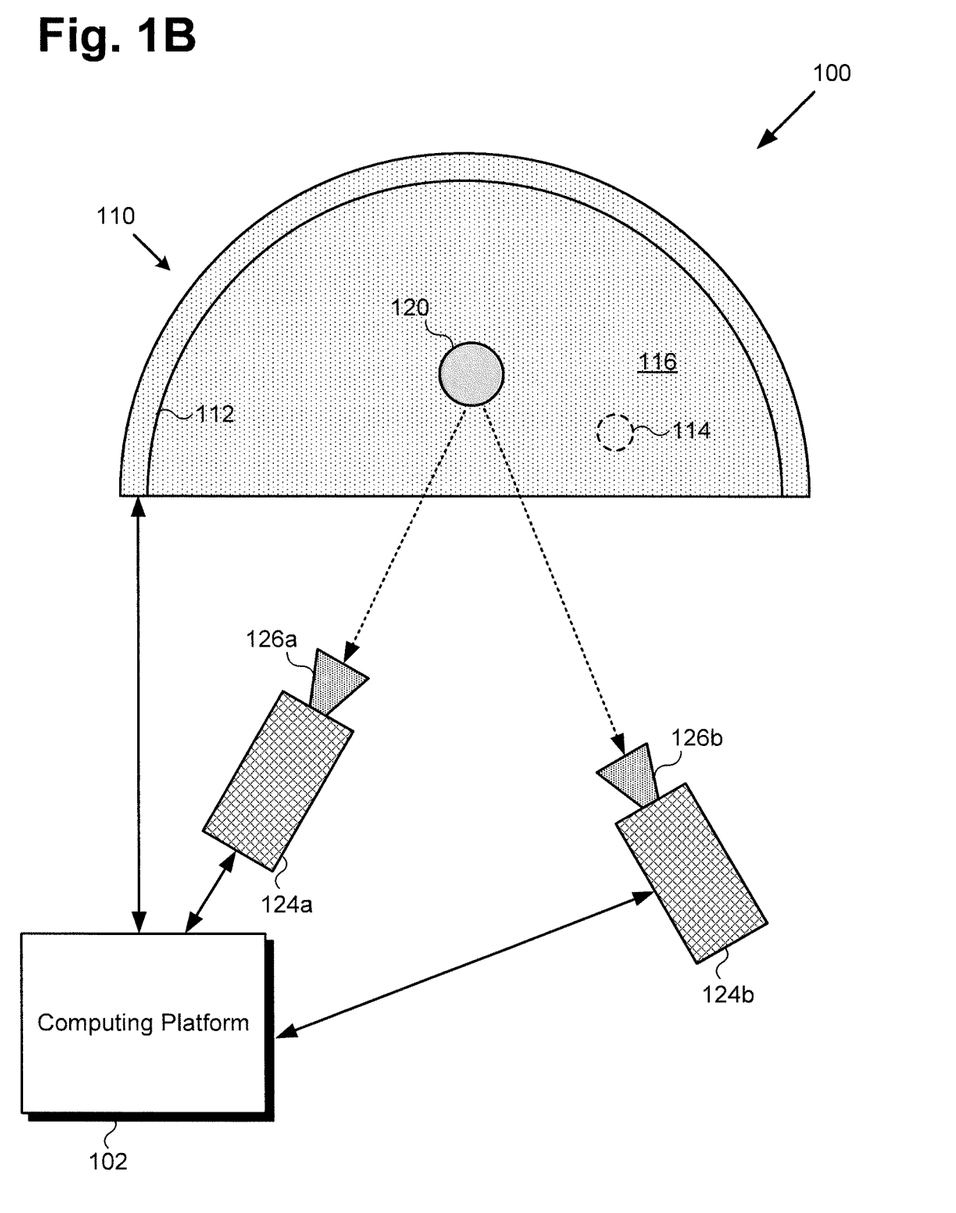
FIG. 1B shows a top view of the system depicted in FIG. 1A, according to one implementation.

FIG. 1B shows a top view of system 100 along perspective lines 1B-1B in FIG. 1A, according to one implementation. It is noted that any features identified by reference numbers identical to those shown in FIG. 1A correspond respectively to those features and may share any of the characteristics attributed to them in the present disclosure, and vice versa. For example, lighting elements 114 of lighting source 110 may take the form of multiple LEDs.

In addition to the features shown in FIG. 1A, FIG. 1B shows that system 100 further includes at least one of camera 124a and camera 124b having respective lenses 126a and 126b, as well as computing platform 102 communicatively coupled to lighting source 110 and one or more of cameras 124a and 124b. Also shown in FIG. 1B is base surface 116 of lighting source 110, which, like surface 112, includes multiple lighting elements 114 used by lighting source 110 to illuminate only base surface 116 or a combination of surface 112 and base surface 116.

It is noted that cameras 124a and 124b may be implemented as high-speed red-green-blue (RGB) digital video cameras, such as professional quality motion picture or television cameras, for example. Alternatively, in some implementations, cameras 124a and 124b may be digital video cameras integrated with a mobile communication device such as a smartphone or tablet computer, for example. Moreover, in some implementations, cameras 124a and 124b may be integrated with computing platform 102.

Cameras 124a and 124b may be designed to capture standard-definition (SD) images, high-definition (HD) images, or ultra-high-definition (UHD) images, as those terms are conventionally used in the art. In other words, cameras 124a and 124b may capture images having less than one thousand pixels of horizontal resolution (SD), those having from one thousand to two thousand pixels of horizontal resolution (HD), or those images having four thousand (4K) or eight thousand (8K) pixels of horizontal resolution (UHD).

It is further noted that cameras 124a and 124b may be designed to track multiple parameters as they record imagery, such as their respective camera locations and one or more characteristics of their respective lenses 126a and 126b. It is also noted that although FIG. 1B shows system 100 to include two cameras 124a and 124b, that representation is merely exemplary. In other implementations, system 100 may include as few as one of cameras 124a and 124b, or may include more, or many more than two cameras.

According to the exemplary implementation shown in FIG. 1B, character 120 is standing on base surface 116 illuminated by lighting source 110. Thus, in some implementations, character 120 may be situated on a portion of the surface of lighting source 110 that is illuminated by lighting source 110. As further shown by FIG. 1B, in some implementations, surface 112 of lighting source 110 forms a concave backdrop for character 120, wherein character 120 is situated between surface 112 illuminated by lighting source 110 and cameras 124a and 124b. It is noted that although surface 112 of lighting source 110 is depicted as a substantially semicircular concave backdrop for character 120 in FIG. 1B, that representation is merely exemplary. In other implementations, it may be advantageous or desirable to implement surface 112 as a substantially flat surface, a convex surface, or having any geometry suitable for a particular use case.

Figure 2:
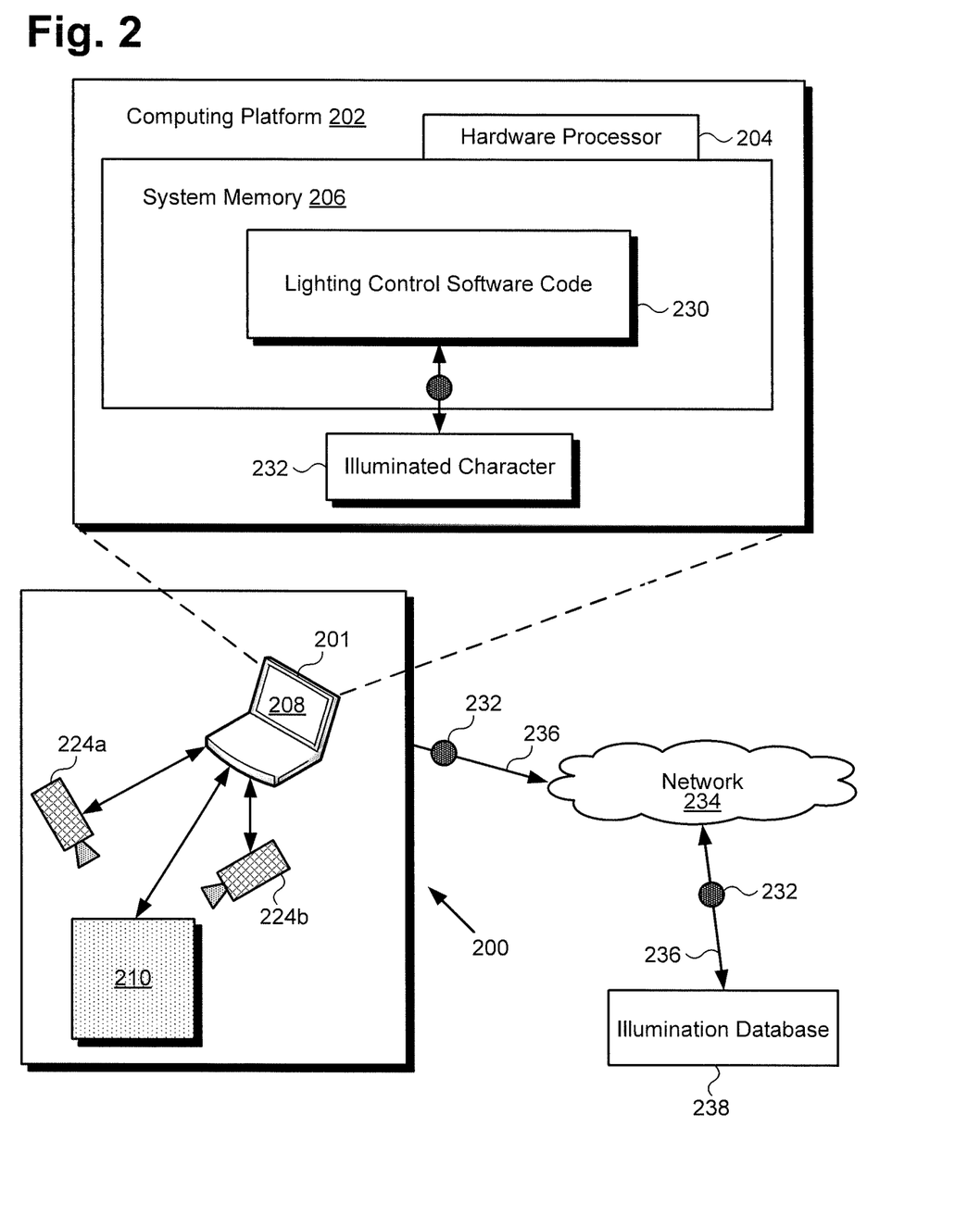
FIG. 2 shows a diagram of a system for illuminating a character for a scene, according to another implementation.

FIG. 2 shows an exemplary diagram of system 200 of a system for illuminating a character for a scene, according to another implementation. As shown in FIG. 2, device 201 includes display 208 and computing platform 202 having hardware processor 204 and system memory 206. System memory 206 is implemented as a non-transitory storage device storing lighting control software code 230, which may be used by system 200 to produce illuminated character 232 as a digital representation corresponding to character 120 in FIGS. 1A and 1B. As further shown in FIG. 2, system 200 also includes lighting source 210 and at least one of cameras 224a and 224b, all communicatively coupled to computing platform 202 of device 201. Also shown in FIG. 2 are communication network 234 providing network communication links 236, and illumination database 238 accessible to system 200 via communication network 234.

System 200 including computing platform 202, lighting source 210, and one or more of cameras 224a and 224b corresponds in general to system 100 including computing platform 102, lighting source 110, and one or more of cameras 124a and 124b. That is to say, computing platform 102, lighting source 110, and cameras 124a and 124b may share any of the characteristics attributed to respective computing platform 202, lighting source 210, and cameras 224a and 224b by the present disclosure, and vice versa. Thus, although not shown in FIG. 1, computing platform 102 may include features corresponding respectively to hardware processor 204, display 208, and system memory 206 storing lighting control software code 230.

It is noted that although the present application refers to lighting control software code 230 as being stored in system memory 206 for conceptual clarity, more generally, system memory 206 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 204 of computing platform 202. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices.

Common forms of computer-readable non-transitory media include, for example, optical discs, RAM, programmable read-only memory (PROM), erasable PROM (EPROM), and FLASH memory.

Communication network 234 may take the form of a packet-switched network such as the Internet, for example. Alternatively, communication network 234 may correspond to a wide area network (WAN), a local area network (LAN), or be implemented as another type of private or limited distribution network. It is noted that the depiction of device 201 as a laptop computer in FIG. 2 is merely exemplary. In various other implementations, device 201 providing computing platform 202 may take the form of a video camera, a desktop computer, a laptop computer, a tablet computer, or a smartphone, to name a few other examples. More generally, device 201 may be any suitable mobile or stationary computing device that implements data processing capabilities sufficient to perform the functionality ascribed to device 201 herein. Furthermore, display 208 of device 201 may be implemented as a liquid crystal display (LCD), a light-emitting diode (LED) display, an organic light-emitting diode (OLED) display, or any other suitable display screen that performs a physical transformation of signals to light. It is noted that, in some implementations, display 208 may be integrated with device 201, such as when device 201 takes the form of a laptop or tablet computer for example. However, in other implementations, for example where device 201 takes the form of a computer tower in combination with a desktop monitor, display 208 may be communicatively coupled to, but not physically integrated with device 201.

Once produced using system 200, illuminated character 232 may be stored locally on system memory 206, or may be transferred to illumination database 238 via communication network 234 and network communication links 236. Moreover, in some implementations, illuminated character 232 may be rendered on display 208 of device 201, or may be rendered into a scene including one or more of backgrounds 122a, 122b, and 122c shown in FIG. 1A, and that scene or those scenes may be output via display 208 of system 200.

Figure 3:
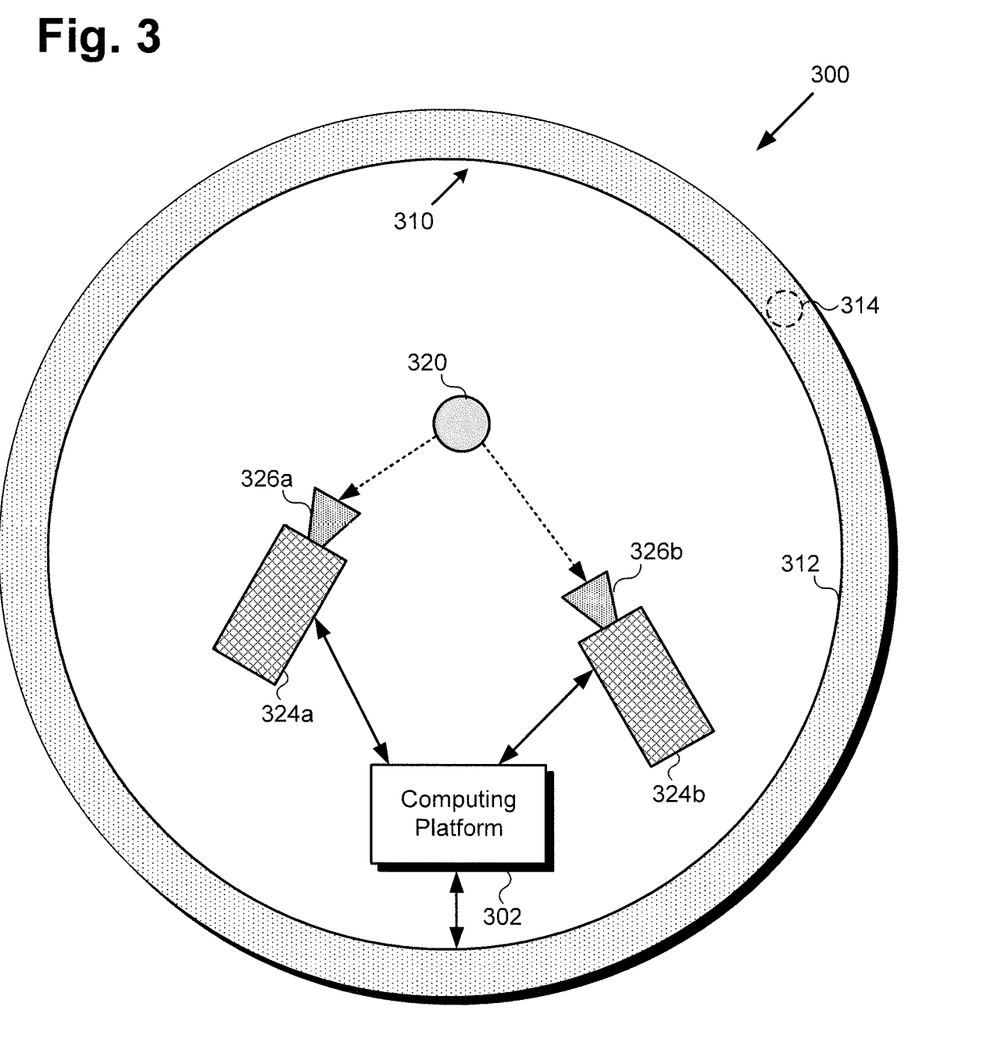
FIG. 3 shows a top view of a system for illuminating a character for a scene, according to yet another implementation.

FIG. 3 shows a top view of system 300 for illuminating a character for a scene, according to yet another implementation. As shown in FIG. 3, system 300 includes computing platform 302 communicatively coupled to lighting source 310 and at least one of cameras 324a and 324b having respective lenses 326a and 326b. As further shown in FIG. 3, lighting source 310 has surface 312 that may be illuminated using multiple lighting elements 314 of lighting source 310. Also shown in FIG. 3 is character 320 being realistically illuminated by system 300.

System 300 corresponds in general to systems 100 and 200, in FIGS. 1A, 1B, and 2, and each of those corresponding systems may share the characteristics attributed to any of systems 100, 200, 300 by the present disclosure. Thus, lighting source 310 may share any of the characteristics attributed to respective lighting sources 110 or 210 by the present disclosure, and vice versa. Furthermore, surface 312 and lighting elements 314 of lighting source 310 may share any of the characteristics attributed to respective surface 112 and lighting elements 114 of lighting source 110 by the present disclosure, and vice versa. In addition, cameras 324a and 324b having respective lenses 326a and 326b may share any of the characteristics attributed to cameras 124a and 124b having respective lenses 126a and 126b, or to cameras 224a and 224b by the present disclosure, and vice versa.

Moreover, computing platform 302 corresponds in general to computing platform 202 provided by device 201, in FIG. 2. Consequently, and although not shown in FIG. 3, computing platform 302 may include features corresponding respectively to hardware processor 204 and system memory 206 storing lighting control software code 230.

It is further noted that character 320 corresponds in general to character 120, in FIGS. 1A and 1B. That is to say, like character 120, character 320 may be a virtual character, a machine such as a robot or animatronic character, a human actor, an animal, or other type of performer, for example. According to the exemplary implementation shown in FIG. 3, and in contrast to the implementation shown by FIG. 1B, lighting source 310 encircles or encloses character 320. For example, and as shown in FIG. 3, lighting source 310 may take the faun of a cylinder encircling character 320. However, in other use cases, it may be advantageous or desirable to implement lighting source 310 using geometry shape other than a cylinder. It is also noted that although FIG. 3 depicts lighting elements 314 as covering substantially the entirety of surface 312, that representation is merely exemplary. In other implementations, lighting elements 314 may be present on a portion, but not cover all of surface 312.

The functionality of systems 100, 200, and 300 will be further described by reference to FIG. 4, which shows flowchart 440 presenting an exemplary method for illuminating a character for a scene, according to one implementation. With respect to the method outlined in FIG. 4, it is noted that certain details and features have been left out of flowchart 440 in order not to obscure the discussion of the inventive features in the present application.

Figure 4:
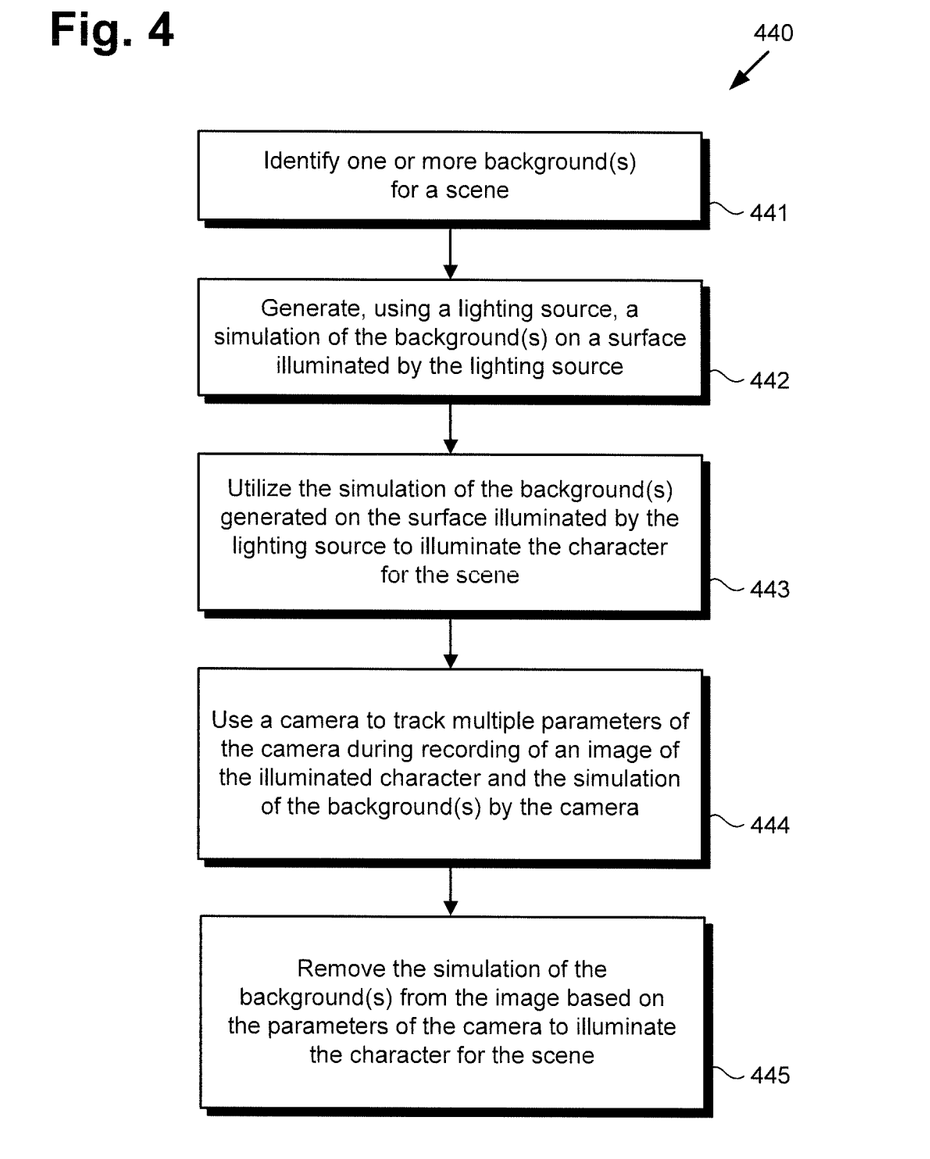
FIG. 4 shows a flowchart presenting an exemplary method for use by a system for illuminating a character for a scene, according to one implementation.

Referring now to FIG. 4 with further reference to FIG. 1A, flowchart 440 begins with identifying one or more of backgrounds 122a, 122b, and 122c for a scene (action 441). Backgrounds 122a, 122b, and 122c may correspond to a wide variety of different environmental lighting conditions. For example, background 122a may depict an outdoor environment at dusk, while background 122b may depict a brightly lighted indoor venue. Background 122c could depict the background shown by background 122a or 122b under different lighting conditions, or may depict an entirely different background. Thus, backgrounds 122a, 122b, and 122c may depict indoor and outdoor venues of locales in urban and rural environments, at different times of day, during different seasons of the year, and under different weather conditions.

Referring to FIG. 2 and FIG. 1A in combination, and assuming for purposes of example that background 122a is identified for the scene including character 120, action 441 may be performed by lighting control software code 230, executed by hardware processor 204 of computing platform 202. In some implementations, identification of background 122a may be performed by lighting control software code 230 based on a user input to device 201. Alternatively, in some implementations, identification of background 122a by lighting control software code 230 may be performed algorithmically, based on the identity of character 120 or a description of the scene for which realistic illumination is being provided.

Referring to FIGS. 1A and 1B with continued reference to FIG. 4, flowchart 440 continues with generating, using lighting source 110, a simulation of background 122a on surface 112 illuminated by lighting source 110 (action 442). As noted above, lighting source 110 may include multiple lighting elements 114, such as LEDs, for use in illuminating surface 112 and simulating background 122a using that illumination. In some implementations, more than one of lighting elements 114 may correspond to each pixel used to simulate background 122a. Referring to FIG. 2, simulation of background 122a on surface 112 may be performed by lighting control software code 230, executed by hardware processor 204, and using lighting source 210.

Flowchart 440 continues with utilizing the simulation of background 122a generated on surface 112 illuminated by lighting source 110 to illuminate character 120 for the scene identified in action 441 (action 443). As shown by FIGS. 1B and 3, lighting sources 110 and 310 may be implemented using a variety of designs to tightly control the illumination of characters 120 and 320. For example, as shown in FIG. 1B, in some implementations, it may be advantageous or desirable to implement surface 112 of lighting source 110 as a concave backdrop providing back and side lighting for character 120. In those implementations, lighting elements 114 in base surface 116 illuminated by lighting source 110 and on which character 120 is situated may be used to provide additional illumination of character 120.

Alternatively, and as shown by FIG. 3, in some use cases it may be advantageous or desirable to implement lighting source 310 so as to illuminate character 320 using illuminated cylindrical surface 312 surrounding character 320. Referring to FIG. 2 in combination with FIGS. 1A, 1B, and 3, illumination of characters 120 and 320 using simulation of background 122a generated on surface 112 or 312 illuminated by respective lighting sources 110 and 310 may be performed by lighting control software code 230, executed by hardware processor 204.

Continuing to refer to exemplary FIGS. 1A and 1B in combination with FIG. 4, Flowchart 440 continues with tracking, using one or more cameras 124a and 124b, multiple parameters of the camera or cameras during recording of an image of illuminated character 120 and simulation of background 122a (action 444). The camera parameters tracked in action 444 may include the location and movement of the camera(s), such as their yaw, pitch, and roll during the recording of the image of illuminated character 120 and simulation of background 122a, as well as one or more characteristics of camera lens 126a and/or camera lens 126b. Exemplary lens characteristics to be tracked in action 444 may include focal length, aperture, field of view (FOV), and lens distortion, to name a few. Referring to FIG. 2 in combination with FIG. 1B, action 444 may be performed by lighting control software code 230, executed by hardware processor 204, and using one or more of camera 124a and camera 124b.

In some implementations, hardware processor 204 may execute lighting control software code 230 to modulate the simulation of background 122a during recording of the image of illuminated character 120 and simulation of background 122a. For example, hardware processor 204 may execute lighting control software code 230 to modulate the simulation of background 122a to further simulate one or more of a change in weather of background 122a and a change in time of background 122a.

Flowchart 440 can conclude with removing the simulation of background 122a from the image including illuminated character 120 and the simulation of background 122a based on the parameters of one or more of camera 124a and camera 124b tracked during action 444 (action 445). It is noted that because one or more camera(s) 124a and 124b are tracked using the same computing platform 102 that drives lighting source 110, simulation of background 122a can be algorithmically rotoscoped, i.e., removed from the image recorded during action 444, leaving a clean and realistically illuminated image of character 120 as illuminated character 232 for later compositing into the scene.

According to the exemplary implementations disclosed in the present application, the parameters of one or more of cameras 124a and 124b such as lens distortion, focal length, yaw, pitch, and roll in relation to surface 112 illuminated by lighting source 110 are tracked to build a pose model of the camera(s). That pose model is correlated to the image recorded during action 444 in order to determine a hypothetical representation of what should be visible on camera if character 120 were not present in combination with background 122a, compared to the recorded image of character 120 and the simulation of background 122a. As a result, in pixel locations where the hypothetical representation and the recorded image correspond, the pixel data may be digitally removed from the recorded image, leaving only illuminated character 232 in a format easily composited into a final scene, or into a real-time simulation such as a video game or an augmented reality (AR) display. Action 445 may be performed by lighting control software code 230, executed by hardware processor 204.

Although not included in the exemplary outline provided by flowchart 440, in some implementations, the present method may further include rendering illuminated character 232 on display 208 of device 201. As noted above, display 208 may take the form of an LCD, an LED display, an OLED display, or any other suitable display screen that performs a physical transformation of signals to light. Rendering of illuminated character 232 on display 208 may be performed using lighting control software code 230, executed by hardware processor 204. Moreover, in some implementations, as discussed above, illuminated character 232 may be rendered into a scene including background 122a, and that scene may be output via display 208 of device 201.

In some implementations, an artificial intelligence (AI) based rendering technique may be employed to increase the resolution (i.e., perform "up-resolution") of illuminated character 232 in real-time. For example, video frames depicting illuminated character 232 may be reprocessed on-the-fly to take advantage of the intrinsic hardware resolution of systems 100, 200, 300, provided the up-resolution process can deterministically recreate the analytical base reference video capturing illuminated character 232 for analysis and comparison.

Regarding action 441 of flowchart 440, it is noted that, in some implementations, identifying background 122a for the scene results in identification of multiple backgrounds 122a, 122b, and 122c. In those implementations, hardware processor 204 of computing platform 202 may further execute lighting control software code 230 to use lighting source 110 to successively generate respective simulations of each of backgrounds 122a, 122b, and 122c on surface 112 illuminated by lighting source 110 during the recording performed in action 444. However, it is noted that light from backgrounds 122b and 122c would typically be completely off when the simulation of background 122a is projected, light from backgrounds 122a and 122c would typically be completely off when the simulation of background 122b is projected, and light from backgrounds 122a and 122b would typically be completely off when the simulation of background 122c is projected. That is to say overlap of different background simulations is generally undesirable.

In one implementation, cameras 124a and 124b implemented as high-speed cameras can be used to capture a rapidly fluctuating environmental lighting model, which may sequentially interleave multiple lighting conditions based on multiple possible backgrounds that may be selected at a later time. By way of example, character 120 may create a live performance that will be virtually composited in an AR device at multiple locations, such as a film premiere lobby, concurrently with other events such as an award ceremony or a public event. Referring to FIG. 3, those multiple locations may be simulated on surface 312 using lighting source 310. In practice, this will advantageously allow the same character, i.e., character 320, to appear virtually and realistically illuminated in multiple disparate lighting environments, such as at a sunset event at a beach, as well as at an overcast event in an urban park.

Thus, the present application discloses solutions for illuminating a character for a scene that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for illuminating a character for a scene using a lighting source and a camera, the system comprising:
   a computing platform communicatively coupled to the lighting source and the camera, the computing platform including a hardware processor and a system memory storing a software code;
   the hardware processor configured to execute the software code to:
      identify a background for the scene;
      generate, using the lighting source, a simulation of the background on a surface illuminated by the lighting source;
      illuminate the character for the scene utilizing the simulation of the background;
      track, using the camera, a parameter of the camera during a recording by the camera of an image of the illuminated character and the simulation of the background, wherein the parameter of the camera includes a lens characteristic of the camera, a yaw of the camera, a pitch of the camera or a roll of the camera; and
      remove the simulation of the background from the image based on the parameter of the camera.

2. The system of claim 1, wherein the hardware processor is further configured to execute the software code to:
   render the illuminated character in the scene including the background, wherein the character is a physical character illuminated by a physical light generated on the surface.

3. The system of claim 1, wherein the lens characteristic of the camera is a focal length of the lens, an aperture of the lens, a field of view of the lens or a distortion of the lens.

4. The system of claim 1, wherein the surface illuminated by the lighting source comprises a plurality of light-emitting diodes (LEDs).

5. The system of claim 1, wherein the surface illuminated by the lighting source forms a concave backdrop for the character, and wherein the character is situated between the surface illuminated by the lighting source and the camera.

6. The system of claim 1, wherein the surface illuminated by the lighting source surrounds the character or forms a cylinder surrounding the character.

7. The system of claim 1, wherein the character is situated on a portion of the surface illuminated by the lighting source.

8. The system of claim 1, wherein the hardware processor is further configured to execute the software code to:
modulate the simulation of the background during the recording to further simulate at least one of a change in weather of the background or a change in time of the background.

9. The system of claim 1, wherein identifying the background for the scene identifies a plurality of backgrounds including the background, and wherein the hardware processor is further configured to execute the software code to:
use the lighting source to successively generate respective simulations of each of the plurality of backgrounds on the surface illuminated by the lighting source during the recording.

10. A system for illuminating a character for a scene using a lighting source and a camera, the system comprising:
a computing platform communicatively coupled to the lighting source and the camera, the computing platform including a hardware processor and a system memory storing a software code;
the hardware processor configured to execute the software code to:
identify a background for the scene;
generate, using the lighting source, a simulation of the background on a surface illuminated by the lighting source;
illuminate the character for the scene utilizing the simulation of the background;
track, using the camera, a parameter of the camera during a recording by the camera of an image of the illuminated character and the simulation of the background; and
remove the simulation of the background from the image by:
building a pose model of the camera using the parameter of the camera;
correlating the pose model with the image to determine a hypothetical representation of the image without the character being present in combination with the background; and
digitally removing pixel data from the image in pixel locations where the hypothetical representation and the image correspond, thereby leaving the illuminated character.

11. A method for use by a system for illuminating a character for a scene, the system including a lighting source, a camera, and a computing platform communicatively coupled to the lighting source and the camera, the computing platform including a hardware processor and a system memory storing a software code, the method comprising:
identifying, by the software code executed by the hardware processor, a background for the scene;
generating, by the software code executed by the hardware processor and using the lighting source, a simulation of the background on a surface illuminated by the lighting source;
illuminating, by the software code executed by the hardware processor, the character for the scene utilizing the simulation of the background;
tracking, by the software code executed by the hardware processor and using the camera, a parameter of the camera during a recording by the camera of an image of the illuminated character and the simulation of the background by the camera, wherein the parameter of the camera includes a lens characteristic of the camera, a yaw of the camera, a pitch of the camera or a roll of the camera; and
removing, by the software code executed by the hardware processor, the simulation of the background from the image based on the parameter of the camera.

12. The method of claim 11, further comprising rendering, by the software code executed by the hardware processor, the illuminated character in the scene including the background, wherein the character is a physical character illuminated by a physical light generated on the surface.

13. The method of claim 11, wherein the lens characteristic of the camera is a focal length of the lens, an aperture of the lens, a field of view of the lens or a distortion of the lens.

14. The method of claim 11, wherein the surface illuminated by the lighting source comprises a plurality of light-emitting diodes (LEDs).

15. The method of claim 11, wherein the surface illuminated by the lighting source forms a concave backdrop for the character, and wherein the character is situated between the surface of the lighting source and the camera.

16. The method of claim 11, wherein the surface illuminated by the lighting source surrounds the character or forms a cylinder surrounding the character.

17. The method of claim 11, wherein the character is situated on a portion of the surface illuminated by the lighting source.

18. The method of claim 11, further comprising modulating the simulation of the background during the recording, by the software code executed by the hardware processor, to further simulate at least one of a change in weather of the background or a change in time of the background.

19. The method of claim 11, wherein identifying the background for the scene identifies a plurality of backgrounds including the background, and wherein the method further comprises using the lighting source, by the software code executed by the hardware processor, to successively generate respective simulations of each of the plurality of backgrounds on the surface illuminated by the lighting source during the recording.

20. A method for use by a system for illuminating a character for a scene, the system including a lighting source, a camera, and a computing platform communicatively coupled to the lighting source and the camera, the computing platform including a hardware processor and a system memory storing a software code, the method comprising:
identifying, by the software code executed by the hardware processor, a background for the scene;
generating, by the software code executed by the hardware processor and using the lighting source, a simulation of the background on a surface illuminated by the lighting source;
illuminating, by the software code executed by the hardware processor, the character for the scene utilizing the simulation of the background;
tracking, by the software code executed by the hardware processor and using the camera, a parameter of the camera during a recording by the camera of an image of the illuminated character and the simulation of the background by the camera; and
removing, by the software code executed by the hardware processor, the simulation of the background from the image by:

building a pose model of the camera using the parameter of the camera;
correlating the pose model with the image to determine a hypothetical representation of the image without the character being present in combination with the background; and
digitally removing pixel data from the image in pixel locations where the hypothetical representation and the image correspond, thereby leaving the illuminated character.

* * * * *